United States Patent
Jensen et al.

(10) Patent No.: US 9,459,091 B2
(45) Date of Patent: Oct. 4, 2016

(54) SENSOR ELEMENT FOR A MEASURING MACHINE, IN PARTICULAR A COORDINATE MEASURING MACHINE

(71) Applicant: HEXAGON TECHNOLOGY CENTER GMBH, Heerbrugg (CH)

(72) Inventors: Thomas Jensen, Rorschach (CH); Frank Saupe, Tübach (CH); Benjamin Vullioud, Gollion (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 193 days.

(21) Appl. No.: 14/397,147

(22) PCT Filed: Apr. 15, 2013

(86) PCT No.: PCT/EP2013/057844
§ 371 (c)(1),
(2) Date: Oct. 24, 2014

(87) PCT Pub. No.: WO2013/160143
PCT Pub. Date: Oct. 31, 2013

(65) Prior Publication Data
US 2015/0101205 A1    Apr. 16, 2015

(30) Foreign Application Priority Data
Apr. 24, 2012  (EP) .................................. 12165403

(51) Int. Cl.
*G01B 11/03*    (2006.01)
*G01B 11/00*    (2006.01)
(Continued)

(52) U.S. Cl.
CPC .............. *G01B 11/007* (2013.01); *G01B 5/012* (2013.01); *G01B 5/016* (2013.01)

(58) Field of Classification Search
CPC ................................................... G01B 11/007
USPC ......................................................... 33/559
See application file for complete search history.

(56) References Cited

U.S. PATENT DOCUMENTS

| 4,523,382 A | 6/1985 | Werner et al. |
| 5,103,572 A * | 4/1992 | Ricklefs ............... G01B 11/007 33/558 |

(Continued)

FOREIGN PATENT DOCUMENTS

| CN | 1051786 A | 5/1991 |
| CN | 1688862 A | 10/2005 |

(Continued)

OTHER PUBLICATIONS

European Search Report dated Oct. 11, 2012 as received in Application No. EP 12 16 5403.

*Primary Examiner* — Christopher Fulton
(74) *Attorney, Agent, or Firm* — Maschoff Brennan

(57) ABSTRACT

The invention relates to a sensor element for a measuring machine, having a sensing component with a sensing element for optically measuring a surface; a sensing element receiving portion with a plate-shaped base; and a sensor housing with a sensing component receiving portion comprising at least one bearing which contacts the base, which has at least one defined bearing point, and via which the sensing component is connected in a movable manner relative to the sensing component receiving portion. The sensor housing has a coupling on a housing coupling side for connecting to the measuring machine and at least partly surrounds the sensing component at the base, and a force directed in the direction of the sensing element is applied to the base. The sensing component receiving portion lies in the sensor housing opposite the coupling side and has the at a least one bearing.

19 Claims, 5 Drawing Sheets

(51) Int. Cl.
*G01B 5/012* (2006.01)
*G01B 5/016* (2006.01)

(56) References Cited

U.S. PATENT DOCUMENTS

| | | | |
|---|---|---|---|
| 5,118,956 A * | 6/1992 | Dunning | G01B 11/007 250/227.19 |
| 5,209,131 A | 5/1993 | Baxter | |
| 5,756,886 A | 5/1998 | Nishimura et al. | |
| 6,449,861 B1 | 9/2002 | Danielli et al. | |
| 6,938,353 B2 * | 9/2005 | Rouge | G01B 5/012 33/558 |
| 7,168,179 B2 | 1/2007 | Baruchello et al. | |
| 7,347,000 B2 * | 3/2008 | Jordil | G01B 5/012 33/559 |
| 8,397,395 B2 | 3/2013 | Jensen et al. | |
| 2011/0229091 A1 | 9/2011 | Jensen et al. | |

FOREIGN PATENT DOCUMENTS

| | | |
|---|---|---|
| DE | 32 15 878 A1 | 11/1983 |
| EP | 1617171 A1 | 1/2006 |
| EP | 2 161 536 A1 | 3/2010 |
| EP | 2 194 357 A1 | 6/2010 |
| WO | 2008/010492 A1 | 1/2008 |

* cited by examiner

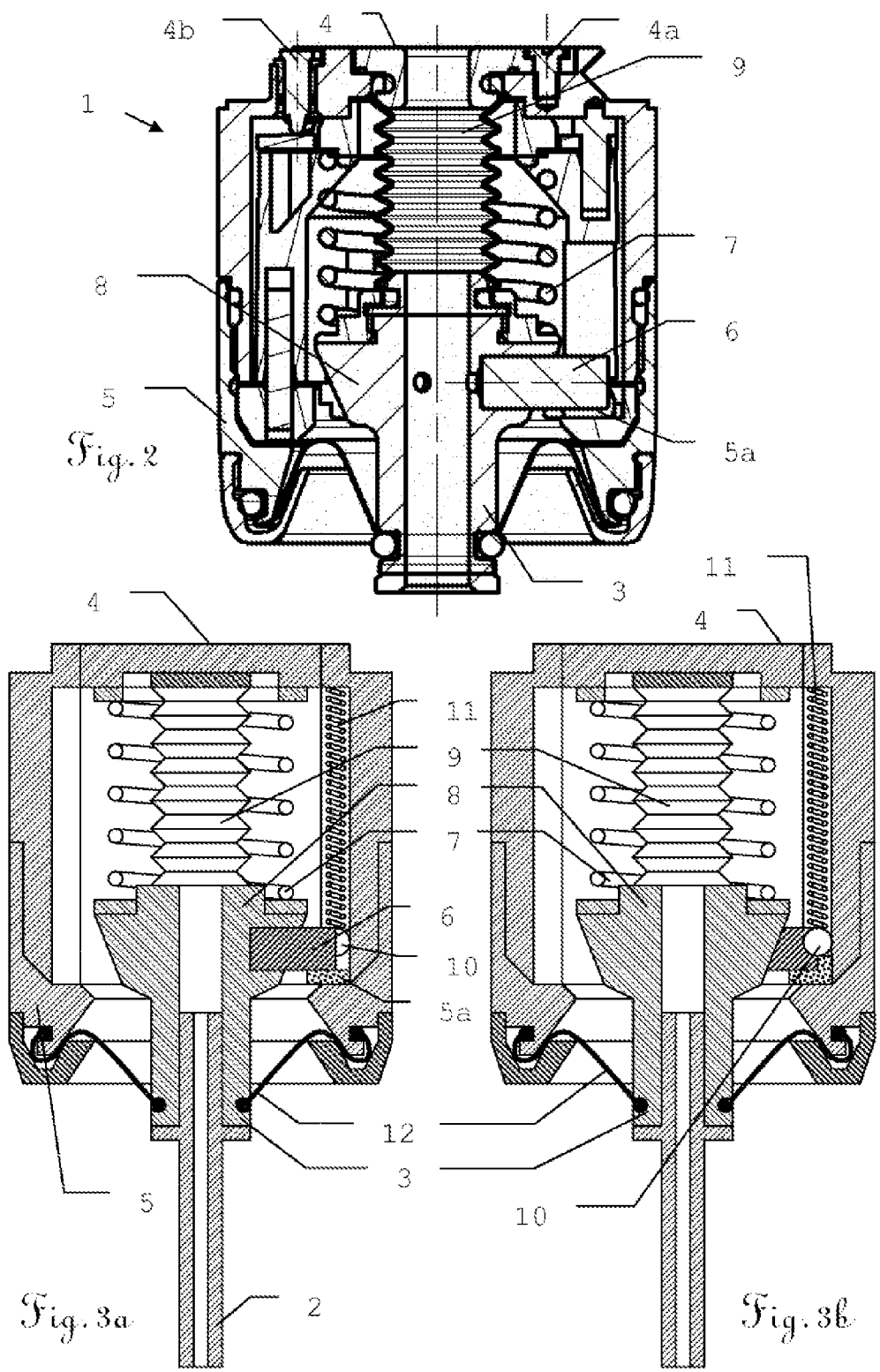

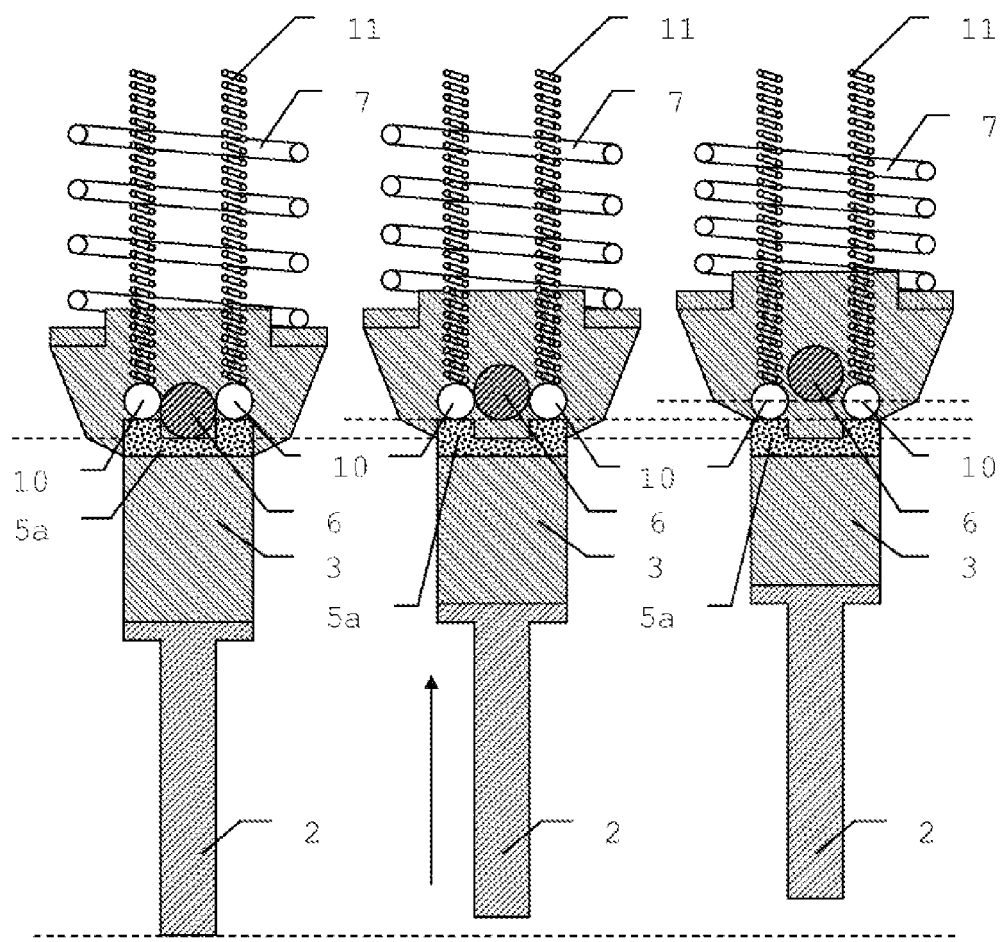

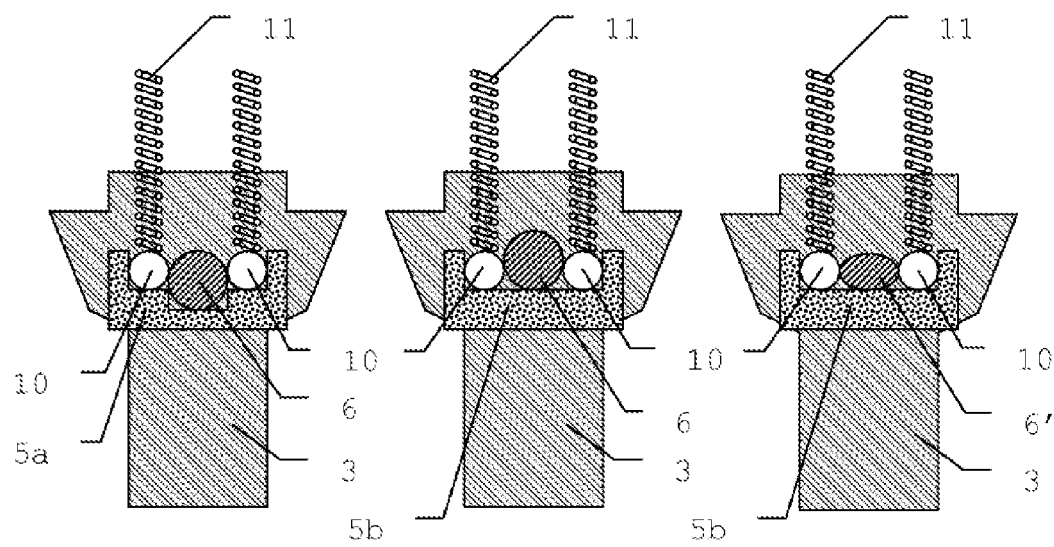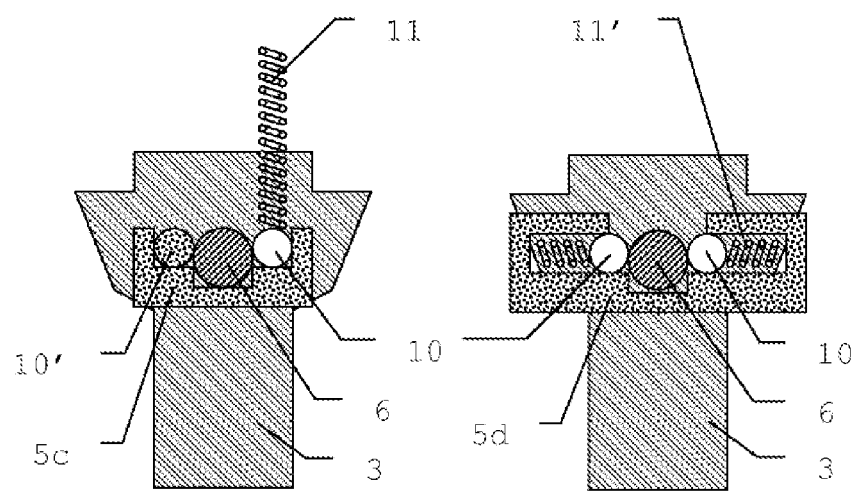

SENSOR ELEMENT FOR A MEASURING MACHINE, IN PARTICULAR A COORDINATE MEASURING MACHINE

FIELD OF THE INVENTION

The invention relates to a sensor element for a measuring machine, in particular a coordinate measuring machine.

BACKGROUND

In many fields of application, there is the need to measure surfaces of objects, and therefore also the objects themselves, with high accuracy. This applies in particular for the manufacturing industry, for which the measurement and checking of surfaces of workpieces is very important. To this end, there is a multiplicity of approaches, which range from contacting methods to optical sensors, in which electromagnetic radiation is used for the measurement.

Usually, a sensor element specific to the respective measurement task is in this case fastened on the measuring machine by means of a coupling. Such sensor elements typically have a probe component with a probe element, which is guided over the surface to be measured and, in the tactile case, touches the surface and measures this surface by generating or maintaining the contact. In the so-called sampling method, or with touch-trigger probes, a switching process is triggered by generation of a mechanical contact with the surface. Such solutions are known, for example, from EP 1 617 171.

As an alternative or in addition, however, contactless optical measurement of the surface may also be carried out, in which case the probe element has a beam path for the measurement radiation and emits this radiation in the direction of the surface and receives it again.

For both measurement methods, owing to the configuration of the probe element, unintended contact or contact associated with excessively high forces in the sense of a collision is disadvantageous and to be avoided. On the one hand, this may be achieved by low speeds and accelerations during the movement of the probe component, although this entails longer measurement times. It is therefore known in the prior art to provide sensor elements with collision protection by virtue of their design, which in the event of unintended contact with a surface avoids or reduces damage to the sensor element, or to the workpiece to be measured, by tilting or release of the probe component.

To this end, in the prior art, sensor elements which attract the probe component mechanically or electromagnetically onto the bearing of a probe component coupling are mostly used, the direction of the force pointing away from the probe element and in the direction of the coupling to the measuring machine, which is also referred to as the so-called z direction or z axis. This arrangement allows simple construction by using electromagnets or permanent magnets and springs. In the event of a lateral collision, the probe component can then tilt relative to the probe component coupling, and either be released or folded back again after a countermovement has been initiated.

For example, EP 2 161 536 discloses an optical sensor with collision protection for a measuring machine, which comprises a sensor-side coupling part for mechanical and optical connection to the measuring machine, and a sensor element. The sensor has a sensor protection coupling as collision protection with a coupling part on the measuring machine side and a coupling part on the sensor element side, the coupling being carried out by the attraction force of magnets or a pulling, i.e. prestressed, tension spring. In the event of a collision, the coupling is opened by tilting. A light waveguide is fed between the coupling parts of the sensor protection coupling, this waveguide being surrounded by a light waveguide protection element, the ends of which are fastened on the associated coupling parts of the sensor protection coupling.

A problem with this is, however, the lack of collision protection, or only minor collision protection, in the z direction, i.e. in the direction of the longitudinal axis of the probe element, so that damage can occur in the event of a sizeable perpendicular movement component. As mentioned, such solutions of the prior art may lead during the folding back to jamming processes of components, for example in the case of optical fibers, for which protective precautions must therefore be taken again. Furthermore, previous solutions do not allow effective damping of the separating or tilting processes.

SUMMARY

Some embodiments provide an improved sensor element for the optical measurement of surfaces, or for the detection of surface topographies.

Some embodiments provide such a sensor element which have improved collision protection in the longitudinal direction of the probe element sampling the surface.

Some embodiments provide improved protection of measurement lines between the probe component and the probe component holder.

Lastly, some embodiments permit damping of the relative movement of the probe component and the probe component holder.

The sensor element is formed in such a way that the probe component carrying the probe element is no longer attracted onto the side of the probe component coupling assigned to the coupling to the measuring machine, but conversely experiences a force which points away from this side. To this end, the housing of the sensor element is formed in such a way that this at least partially encloses a base of the probe component, which is used for movable or releasable connection to the probe component holder, so that the sensor element comprises a probe component holder which lies opposite the coupling side for the connection to the measuring machine. Between this probe component holder and the coupling side, the base is arranged and is pressed by a force in the direction of the probe component holder and therefore in the direction of the probe element. The base is in this case received by at least one bearing that is arranged on the probe component holder, which to this end may be formed annularly.

The force acting in the direction of the probe component holder, and therefore in the direction of the probe element, is exerted according to the invention by a centrally arranged cylindrical or spindle-shaped compression spring, which on the inside has an optical fiber that is used for guiding measurement radiation onto the surface, and therefore for measurement of the latter. By virtue of the central guiding, unrestricted mobility which is of the same type in all directions is additionally ensured. Furthermore, the risk of the fiber jamming when the base of the probe component is folded back is avoided, and this fiber only needs to have small longitudinal displaceability owing to its central guiding. The solution according to the invention can therefore also obviate a separate protection element for the fiber. The compression spring may equivalently also be replaced with a ring-shaped arrangement of a plurality of individual springs, so long as these likewise ensure guiding of the fiber on the inside. The compression spring may also be formed equivalently in a conical or other shape essentially surrounding the fiber and creating a guide channel. By virtue of such guiding, on the one hand fiber guiding in the central axis is made possible, so that the tilting movement can take place in the same way in all directions. On the other hand, with an appropriate configuration, for example with a relatively small slope, the spring may also perform a protective effect for the fiber, since it can prevent both displacement of the fiber outward, i.e. outside the central axis, and penetration of the other components into the central guide channel defined by the compression spring.

The effect of the structure is in this case that the force used for the fixing or coupling at the same time also permits movement in the z direction, i.e. in the longitudinal axis of the probe element and in the direction toward the connection to the measuring machine, and opposes this with a braking effect.

By virtue of the force action in the direction of the probe element, a collision acting in its longitudinal axis can furthermore be absorbed, without damage occurring. In this case, the base may advantageously comprise a cylinder or a roller which rests in a bearing, the two contact points of which are defined by two spring-loaded balls or rollers. Depending on the setting of the permissible relative movement between the base, or its cylinder, and the balls of the bearing, the arrangement may be formed as pure collision protection for the optical probe or in addition also as a switching probe, i.e. as a touch-trigger probe.

As a result, the sensor element therefore has a spring-assisted bearing of the probe, or of the probe element, in three directions, i.e. the so-called x, y and z directions. In contrast to the sensor elements of the prior art, the latitude of movement in the z direction is great enough to permit genuine collision protection in this direction as well. Furthermore, the spring characteristic of the acting force causes braking and dynamic absorption of acting collision forces. In the case of optical systems, and when moving tactile systems to their starting positions, higher speeds are possible since a collision due to a vertical movement can also be dealt with.

It is also advantageous to fill the section of the sensor housing containing the base of the probe component and its bearing with oil or other fluid media having a damping effect, since a high restoring accuracy can be ensured in this way. Oil filling therefore also reduces the need for calibration.

Corresponding filling of sensor elements of the species according to the precharacterizing clause with oil or other fluid media furthermore represents a separate invention, which may be implemented independently of the centrally arranged cylindrical or spindle-shaped compression spring. In particular, the feature that the base and the at least one bearing of a sensor element of the species, as also defined by the precharacterizing clause, are arranged in an oil-filled section of the sensor housing may be combined with the claim features not necessarily relating to the centrally arranged cylindrical or spindle-shaped compression spring.

BRIEF DESCRIPTION OF THE DRAWINGS

A sensor element according to the invention will be described or explained in more detail purely by way of example below with the aid of exemplary embodiments represented as figures or schematically in the drawing. In detail:

FIG. 2 shows the representation of the sensor housing, and of the components arranged therein, of the first exemplary embodiment of the sensor element according to the invention;

FIGS. 3a-b show the schematic representation of the components, arranged in the sensor housing, of the first exemplary embodiment of the sensor element according to the invention;

FIGS. 4a-c show the schematic representation of the relative movement of the probe component relative to the bearing arranged on the probe component holder in a sensor element according to the invention;

FIGS. 5a-e show the schematic representation of exemplary embodiments according to the invention of probe components and bearings.

DETAILED DESCRIPTION

Figure 1:
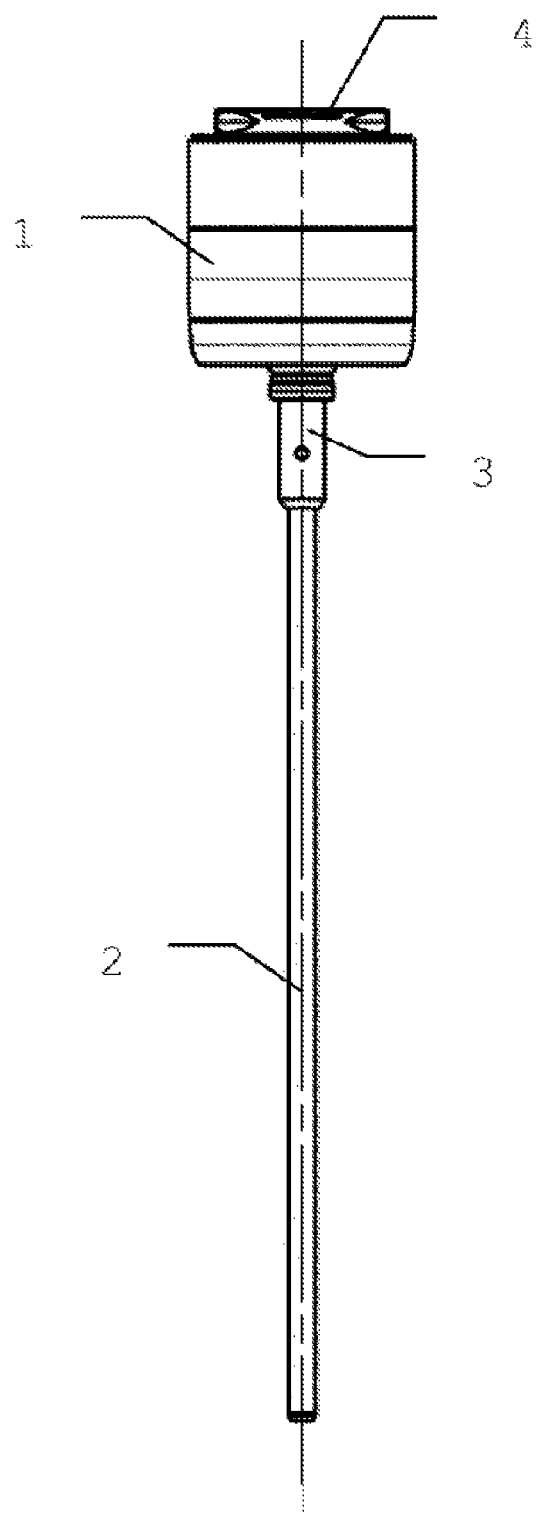
FIG. 1 shows the representation of a first exemplary embodiment of the sensor element according to the invention.

FIG. 1 shows the representation of a first exemplary embodiment of the sensor element according to the invention in an external view. The sensor housing comprises an optical and/or tactile probe component, which in turn consists of a probe element 2 and a probe element holder 3 receiving the latter, and is used for the measurement of a surface, the probe element being moved in a proximity relation to the surface, i.e. it is guided at a measurement distance optimal for the optical measurement. In the case of an additional or supplementary switching configuration, direct contacting of the surface may also be carried out in this case. The probe element may in this case move with the lower end, or the lower region, sampling the surface, or in this region it may emit and again receive optical measurement radiation.

The sensor housing 1 contains a probe component holder having a bearing which contacts at least one part of the probe element holder 3, and by means of which the probe component and therefore the probe element 2 is connected movably relative to the probe component holder, or the sensor housing 1. On the coupling side lying opposite the probe element 2, the sensor housing 1 has a coupling 4 for connection, in particular releasable connection, to the measuring machine. In this case, the sensor element is typically mounted on an element of an articulated arm or a quill which can be displaced in a plurality of axes, in which case the changing of sensor elements and their mounting or coupling are often carried out in an automated fashion.

In order to achieve the mobility, a wound optical fiber with a length of several centimeters may be arranged in the upper part of the sensor housing 1, which allows increased flexibility in the production and maintenance processes. An optical connection to the measuring machine can be produced by plug connections, so that the evaluation electronics can remain outside the sensor element. An example of such a configuration as an optical sensor element may be found in EP 2 194 357.

FIG. 2 and FIGS. 3a-b respectively give the detailed and schematic representation of the sensor housing 1 and the components, arranged therein, of the first exemplary embodiment of the sensor element according to the invention. Inside the sensor housing 1, there is the base 8 of the probe element holder 3, which the sensor housing 1 or the probe component holder 5 comprises. This probe component holder 5 is arranged opposite the coupling side in the sensor housing 1 and carries at least one bearing. A contact surface, in particular an annular contact surface, facing toward the coupling side, for receiving the at least one bearing, may be formed on the probe component holder 5. A bearing is respectively formed by two balls 10, which have a distance between them and are held in their position by springs 11.

The base 8 has projections, or extensions, which act as journals 6 and, for example, are formed as cylinders or rollers. These journals contact the two balls 10 of the bearing, so that two defined contact points are defined. The distance between the balls 10 is in this case matched to the diameter of the journals 6. The movement of the journal 6 inside the bearing, i.e. in the position between the balls 10, is restricted by a stop 5a. The penetration depth of the journal 6 into the balls 10, and therefore the forces acting as well as the dynamics and the release characteristic of the bearing, are determined by this stop 5a.

Between the balls 10 and the journals 6 lying between them in the resting state, an electrically conductive connection is produced on the contact points, which may be continued via the springs 11 so that deflection of the journal 6 out of the bearing is detected by the breaking of the electrical circuit. In this way, a circuit arrangement can both register triggering upon contact of the probe element 2 with the surface in the case of a sampling configuration, and also identify a collision event.

Advantageously, the base 8 is formed in the shape of a plate, i.e. with a subregion increased in cross section relative to the remaining regions of the probe element holder 3, and has three journals 6 arranged at a spacing of 120°, each of which is assigned a bearing. These bearings, or the associated journals 6, may lie either in the plane of the plate-shaped base 8 or a plane parallel thereto. Equally, a plate-shaped design may also be obviated but a bearing of the same type may nevertheless be carried out, in which case the journals are optionally formed with a comparatively larger length. However, a mechanically favorable and stable arrangement can be achieved by the plate-shaped configuration.

In this arrangement, the bearing of the probe component is statically determined. Nevertheless, a number of bearings or journals 6 different thereto may also be used. For example, a rotary articulation or a hinge may also be used instead of one of the three combinations of bearings and journals 6, when the measuring machine has a preferential measuring direction or when there are other restrictions in terms of the measuring direction or the collision processes.

The base 8 of the probe component therefore lies between the coupling side and the probe component holder 5, and receives a force directed in the direction of the probe element 2, which is generated by a compression spring 7 as an element for generating the force. The force therefore acts in the direction of the end of the probe element, which in the operating state faces toward the surface, or the workpiece as a whole, i.e. the force presses this probe element away from the connection to the measuring machine carrier component guiding the sensor element, which results in a force acting in the direction of the surface which counteracts the force exerted by the surface upon contact. Owing to the resilient configuration, the arrangement yields in this direction, the movement thereby generated being braked by the counteracting force of the compression spring 7.

Instead of a compression spring, other force-generating elements may however also be used, for example electromagnets or permanent magnets in a repulsive arrangement, or pneumatic or hydraulic components, in which case these should preferably be configured with a resiliently acting deflection feature of the probe component, or its base 8. The use of a coil spring as a centrally arranged cylindrical or spindle-shaped compression spring offers the advantage according to the invention that an optical fiber, or also in addition another measurement line, may be guided inside it, i.e. in particular in its longitudinal axis.

In order to ensure damping of the movements and high repetition accuracy, the part of the sensor housing 1 containing the mechanism of the probe component may be filled with oil or another movement-damping liquid. In order to externally seal the oil-filled region, the sensor housing 1 is closed at the bottom with a membrane 12. Measurement lines may furthermore be guided in a bellows 9 arranged centrally, in particular inside the compression spring 7.

Besides a plug coupling for an optical fiber as an optical contact 4a, the coupling 4 may also comprise three electrical contacts 4b for collision detection, for connection to a readable and preferably programmable, or reprogrammable, storage medium located in the sensor housing, for example an EEPROM, and for grounding. The individual data or parameters for each sensor element are stored in the storage medium or EEPROM, for example serial number, focal position of the optical probe function, working range and length of the probe element 2, so that the sensor element as a so-called smart probe provides its specific data after production to the communication connection in the scope of the coupling process. The storage medium may in this case likewise be externally read or programmed via the electrical contacts 4b. Furthermore, other sensor components or sensors, for example a temperature sensor or inertial sensor, may also be arranged in the sensor housing 1, or the sampling or collision-detecting measurement functionality may be integrated by a corresponding circuit arrangement.

FIGS. 4a-c explain in a schematic representation a vertical relative movement of the probe component relative to the bearing arranged on the probe component holder in a sensor element according to the invention. In FIG. 4a, the state for collision protection is represented with a journal 6 fully coupled into the bearing. This journal 6 now lies with its midpoint below the midpoint of the balls 10, which are respectively fixed in their position by an associated spring 11. According to the invention, however, other bearing components may also be used instead of the balls 10, for example two rollers. The stable position of the journal 6 is defined by the stop 5a formed as an indentation, so that a sliding bearing is produced with two contact points on the balls and a stop. Depending on the choice of the stop depth and the radius of the balls 10, as well as the radius of the journal 6, the triggering characteristic of the bearing can be adjusted from robust collision protection, which requires a minimum force for decoupling and releasing the journal 6 from the bearing, to a labile equilibrium of a sampling probe, with which even the minor force action of light sampling leads to release of the electrical connection between the journal 6 and at least one of the two balls 10, and therefore to a switching process.

In the event of a collision with an object, which displaces the probe element 2 and therefore the probe component in the direction of the coupling, i.e. in the z axis represented here vertically, a movement of the probe element holder 3 and therefore of the journal 6 also takes place in the same direction, which raises the latter relative to the balls 10 of the bearing. This movement is illustrated in FIG. 4b. In this state, although the mechanical fastening of the journal is already broken, the electrical contact and therefore the electrical circuit nevertheless remain closed owing to the unchanged contact of the journal 6 with the balls 10. The latitude of movement made possible for the journals 6 while maintaining the electrical contact allows, for example, slight grazing of an object with damage being avoided by the permissible deflection of the probe element 2, but without a collision being detected simultaneously. There is therefore a certain margin of the allowed contacts. However, if the movement exceeds the permissible extent preset by the choice of ball and journal radii and the stop depth, as represented in FIG. 4*c* then the electrical contact is broken so that the occurrence of a collision is detected and the drive can be turned off or be reversed in its movement direction. Damage can be avoided by the remaining latitudes for further spring suspension. In order to control such a movement process, the sensor element or the measuring machine may comprise a switching arrangement, which is formed in such a way that the opening of the electrical circuit due to contact of the probe element 2 with the surface is registered as a sampling switching process.

In order to permit stable and statically determined mounting, which allows movement of the sensor element in three axes, the probe component holder is configured in such a way that it has three bearings contacting the base, or its journals 6, which are arranged in a plane parallel to the base with an angular spacing of 120° with respect to one another.

Various exemplary embodiments according to the invention of probe components comprising journals 6 and bearings will be represented schematically in FIGS. 5*a-e*.

FIG. 5*a* shows the bearing arrangement used in FIGS. 4*a-c* with a stop 5*a* comprising a groove for the journal 6, so that the midpoint, i.e. the longitudinal axis of the journal 6, comes to lie below the midpoint of the balls 10. In order to overcome the fastening in the bearing, the journal 6 must be moved through a distance upward, with the journal maintaining the electrical contact with the balls 10. In this case, the balls 10 must execute a slight lateral movement during the movement of the journal, so that the corresponding latitude therefor has to be provided.

FIG. 5*b* shows an arrangement in which the midpoint of the journal 6 lies above the midpoint of the balls 10 owing to the plane surface of the stop 5*b*, so that fastening in the bearing is carried out only by means of the force acting on the base of the probe component. Even small deflections lead to opening of the electrical circuit, so that gentle sampling of the probe element on a surface to be measured can be detected and a corresponding signal can be generated. At the same time, the collision protection already explained above is achieved by this arrangement. In this case, it is possible to distinguish between intended sampling and unintended collision by, for example, taking additional information into account. If, for example, when approaching a workpiece to be measured, contact is detected in a spatial range which lies outside the spatial volume of the workpiece, this is qualified as a collision. In this way, with a mechanically identical configuration, such an arrangement may be used both for a sampling measurement function and for collision detection depending on the operating state, or additional information.

In principle, the same diameters may also be selected for the journals 6 and the balls 10, or alternatively the journals 6 may be formed with an elliptical cross section, which is shown in FIG. 5*c*. If the midpoints and the contact points lie in a plane perpendicular to the vector of the force acting in the direction of the probe element 2, then—without taking this force into account—a labile equilibrium which is characterized by the friction at the contact points is achieved.

As represented in FIG. 5*d*, instead of two balls or rollers, one of the two contact points may also be formed by a curved surface of a shaped part 10' which is used as a stop 5*c*.

Likewise, the spring bearing may be implemented not only by balls 10 with springs aligned in the direction of the probe element, but also by springs 11' oriented perpendicularly or at a different angle, as will be explained in FIG. 5*e*.

Figures 6A, 6B, 6C:
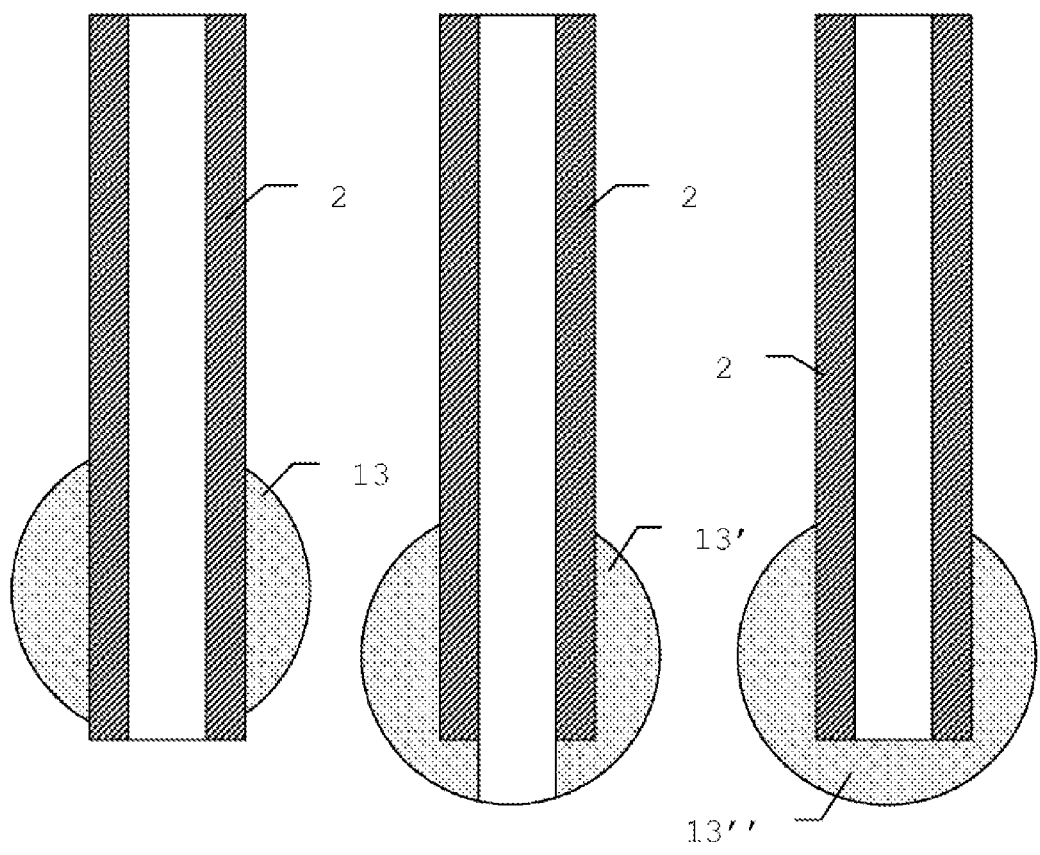
FIGS. 6a-c show the schematic representation of exemplary embodiments according to the invention of a probe element for optical and tactile measurement.

FIGS. 6*a-c* show the schematic representation of exemplary embodiments of a probe element for optical and tactile measurement, in which case this configuration of a probe element may also be implemented independently of the sensor element according to the invention. In this case, a probe element 2 with optical beam guiding for the optical measurement also carries a ball 13, 13' or 13" for tactile measurement of the surface. The ball 13, 13' or 13" has an aperture for the optical beam guiding, which as represented in FIG. 6*a* is formed as an opening in the ball 13, which is formed as one end of an optical component for beam guiding, for example an optical fiber, so that the measurement radiation does not need to be optically guided through the ball material.

Equally, the end of such a beam guiding component may however also be arranged offset into the interior of the ball 13', as represented in FIG. 6*b*, so that at least a part of the beam path is moved inside the ball, although in this case the beam guiding takes place as free-beam optics in relation to the material of the ball 13', i.e. it does not shine through the ball.

Lastly, the radiation may also be guided through the material of the ball 13", so that there is continuous external closure. This, however, requires that the ball 13", or its material, is transmissive for the wavelength used for the optical measurement. In this case, the curvature of the ball 13" may also be used for beam shaping of the measurement radiation.

What is claimed is:

1. A sensor element for a measuring machine, comprising:
   a probe component having a probe element for optical measurement of a surface and a probe element holder with a plate-shaped base,
   a sensor housing with a probe component holder comprising at least one bearing which contacts the base and has at least one defined contact point by means of which the probe component is connected movably relative to the probe component holder,
   wherein the sensor housing has a coupling side with a coupling for a releasable connection, with the measuring machine, and optical contacts and/or electrical contacts,
   wherein the sensor housing at least partially encloses the probe component on the base and a force directed in the direction of the probe element is applied to the base,
   wherein the probe component holder lies opposite the coupling side in the sensor housing and carries the at least one bearing; and
   wherein the base of the probe component is arranged between the coupling side and the probe component holder,
   wherein a centrally arranged cylindrical or spindle-shaped compression spring, which presses the base against the at least one bearing and comprises an optical fiber guided in its longitudinal axis, is arranged between the coupling side and the base of the probe component.

2. The sensor element as claimed in claim 1, wherein the probe component is furthermore also formed for tactile measurement of the surface as a switching probe.

3. The sensor element as claimed in claim 1, wherein the probe component holder comprises an annular contact surface facing toward the coupling side for receiving the at least one bearing.

4. The sensor element as claimed in claim 1, wherein the base comprises at least one journal with curved surfaces for bearing on the at least one contact point of the bearing, and
the at least one bearing comprises at least one spring-loaded ball or roller for definition of the at least one contact point.

5. The sensor element as claimed in claim 4, wherein the at least one bearing comprises at least two spring-loaded balls.

6. The sensor element as claimed in claim 1, wherein the at least one bearing is formed as a sliding bearing.

7. The sensor element as claimed in claim 1, wherein the probe component holder comprises three bearings contacting the base, which are arranged in a plane parallel to the base with an angular spacing of 120° with respect to one another.

8. The sensor element as claimed in claim 1, wherein a closed electrical circuit is defined by the contact of the base with the at least one contact point.

9. The sensor element as claimed in claim 8, wherein the electrical circuit is fed out via the electrical contacts through the coupling side for evaluation.

10. The sensor element as claimed in claim 8, wherein a circuit arrangement, which is formed in such a way that opening of the electrical circuit caused by contact of the probe element with the surface can be registered
as a sampling switching process and/or
as a collision.

11. The sensor element as claimed in claim 1, wherein a readable and programmable electronic storage medium for providing parameters of the sensor element is arranged inside the sensor housing, one which can be read out and optionally programmed via the electrical contacts of the coupling side.

12. The sensor element as claimed in claim 1, wherein the base and the at least one bearing are arranged in an oil-filled section of the sensor housing.

13. The sensor element as claimed in claim 12, wherein a central oil-tight bellows for axial guiding of the optical fiber and of an additional cable.

14. The sensor element as claimed in claim 1, wherein the probe element comprises both an optical beam guiding for optical measurement and a ball for tactile measurement of the surface.

15. The sensor element as claimed in claim 14, wherein the ball has an aperture for the optical beam guiding and is transmissive for the wavelength used for the optical measurement.

16. The sensor element as claimed in claim 14, wherein the measuring machine is a coordinate measuring machine.

17. The sensor element as claimed in claim 14, wherein the at least one defined contact point comprises two defined contact points.

18. The sensor element as claimed in claim 14, wherein the probe component comprises a switching probe.

19. The sensor element as claimed in claim 14, wherein the base comprises at least one a cylinder directed radially outward.

* * * * *